(12) United States Patent
Snowdon

(10) Patent No.: US 11,108,681 B2
(45) Date of Patent: Aug. 31, 2021

(54) SYSTEMS FOR TRANSMITTING A DATA STREAM AND METHODS FOR TRANSMITTING A DATA STREAM

(71) Applicant: Arista Networks, Inc., Santa Clara, CA (US)

(72) Inventor: David Snowdon, Darlinghurst (AU)

(73) Assignee: Arista Networks, Inc., Santa Clara, CA (US)

(*) Notice: Subject to any disclaimer, the term of this patent is extended or adjusted under 35 U.S.C. 154(b) by 150 days.

(21) Appl. No.: 16/302,954

(22) PCT Filed: May 19, 2017

(86) PCT No.: PCT/AU2017/050471
§ 371 (c)(1),
(2) Date: Nov. 19, 2018

(87) PCT Pub. No.: WO2017/197465
PCT Pub. Date: Nov. 23, 2017

(65) Prior Publication Data
US 2019/0268260 A1     Aug. 29, 2019

(30) Foreign Application Priority Data
May 20, 2016 (AU) ................................ 2016901918

(51) Int. Cl.
*H04L 12/707* (2013.01)
*H03M 5/00* (2006.01)
(Continued)

(52) U.S. Cl.
CPC ............. *H04L 45/22* (2013.01); *G06Q 40/04* (2013.01); *H03M 5/00* (2013.01); *H04L 7/0033* (2013.01); *H04L 65/80* (2013.01)

(58) Field of Classification Search
CPC ....... H04L 45/22; H04L 7/0033; H04L 65/80; H03M 5/00; H03M 5/20; G06Q 40/04
See application file for complete search history.

(56) References Cited

U.S. PATENT DOCUMENTS 8,326,988 B2    12/2012   Poelstra et al.
10,672,075 B1 *    6/2020   To ......................... G06Q 40/04
(Continued)

FOREIGN PATENT DOCUMENTS

AU      2014101296 A4    11/2014
WO      2001/050378 A2    7/2001
(Continued)

OTHER PUBLICATIONS

International Search Report issued in corresponding Application No. PCT/AU2017/050471, dated Jul. 3, 2017.
(Continued)

*Primary Examiner* — Shailendra Kumar
(74) *Attorney, Agent, or Firm* — Chamberlain, Hrdlicka, White, Williams & Aughtry

(57) ABSTRACT

Disclosed herein is a system (10) for transmitting a data stream (12). The system (10) is configured to receive the data stream (12). The data stream (12) carries a plurality of orders that are destined for a market (24) configured for electronic trading. The system (10) is configured to transmit the data stream (12) carrying the plurality of orders. The system (10) is configured to process at least the plurality of orders (12) to determine trading risk information (14) indicative of trading risk. The system (10) is configured to determine if the trading risk indicated by the trading risk information (14) satisfies a trading risk condition (16). The system (10) is configured to cease transmitting the data stream (12) carrying the plurality of orders if the trading risk condition is determined to be satisfied and commenced transmitting another data stream (18) destined for the elec-
(Continued)

tronic market. Also disclosed herein is a method for transmitting a data stream (12).

20 Claims, 8 Drawing Sheets

(51) Int. Cl.
    *G06Q 40/04*     (2012.01)
    *H04L 7/00*     (2006.01)
    *H04L 29/06*     (2006.01)
    *H03M 5/20*     (2006.01)

(56) References Cited

U.S. PATENT DOCUMENTS

| | | | |
|---|---|---|---|
| 2006/0067449 A1* | 3/2006 | Boehl | H04L 1/22 375/354 |
| 2011/0145125 A1* | 6/2011 | Foygel | G06Q 30/0601 705/37 |
| 2011/0178915 A1 | 7/2011 | Vinokour et al. | |
| 2012/0151247 A1* | 6/2012 | Ferraiolo | H04L 25/14 714/4.5 |
| 2012/0203686 A1* | 8/2012 | Burgis | G06Q 30/06 705/37 |
| 2012/0254011 A1* | 10/2012 | Studnitzer | G06Q 40/025 705/37 |
| 2012/0284158 A1* | 11/2012 | Kovac | G06Q 40/06 705/37 |
| 2015/0106251 A1* | 4/2015 | Farnstrom | G06Q 40/04 705/37 |

FOREIGN PATENT DOCUMENTS

| | | |
|---|---|---|
| WO | 2008/140631 A1 | 11/2008 |
| WO | 2016/023062 A1 | 2/2016 |
| WO | 2016/145016 A1 | 9/2016 |
| WO | 2016/179539 A1 | 11/2016 |
| WO | 2017/024361 A1 | 2/2017 |

OTHER PUBLICATIONS

Written Opinion issued in corresponding Application No. PCT/AU2017/050471, dated Jul. 3, 2017.

* cited by examiner

SYSTEMS FOR TRANSMITTING A DATA STREAM AND METHODS FOR TRANSMITTING A DATA STREAM

TECHNICAL FIELD

The disclosure herein generally, but not exclusively, relates to a system for transmitting a data stream and a method for transmitting a data stream, and particularly but not exclusively to such systems and methods having low latency.

BACKGROUND

A legal person, for example an individual or a company ("a person"), may trade financial instruments on an electronic market, which may generally benefit from networking technology that has latency lower than is generally expected. An electronic market generally, but not necessarily, has an electronic trading platform to facilitate electronic trading (e-trading), for example platforms similar or identical to those at either one of NYSE and NASDAQ, or generally any commercial and/or proprietary electronic trading platform. An example of an electronic trading platform includes NASDAQ OMX.

Electronic orders may be generated by a client controlled by person. The client is generally a machine executing software. The software generally includes a trading algorithm defining a financial instrument trading strategy that generates orders in response to received market data, and/or in response to an order keyed in by a user of the machine. The machine may comprise, for example, extraordinary hardware components such as a low latency network card (for example, a 10 Gb Ethernet network card with PCIe III that is directly connected to a processor cache of the machine), and large RAM blocks. The extraordinary hardware components may reduce the latency of the data packets sent by the client, which may be necessary for a competitive high-frequency trading strategy, for example.

The trading of financial instruments may be a financially risky activity. There is no guarantee of profit and the potential for financial loss is significant. Controlling or limiting the financial risk associated with the trading of financial instruments may be desirable.

Determining and controlling risk, however, may introduce significant latency to the transmission of orders to the electronic market. Latency is generally undesired by people who trade financial instruments because trading is competitive, and market values may rapidly fluctuate. This is especially true of persons engaged in high frequency trading of financial instruments. If an order is delayed an opportunity for profit may be missed or losses may be compounded.

A system that manages trading risk without delaying transmission of electronic orders may be favoured.

SUMMARY

Disclosed herein is a system for transmitting a data stream. The system is configured to receive the data stream. The data stream carries a plurality of orders that are destined for a market configured for electronic trading. The system is configured to transmit the data stream carrying the plurality of orders. The system is configured to process at least the plurality of orders to determine trading risk information indicative of a trading risk. The system is configured to determine if the trading risk indicated by the trading risk information satisfies a trading risk condition. The system is configured to cease transmitting the data stream carrying the plurality of orders if the trading risk condition is determined to be satisfied and commence transmitting another data stream destined for the market.

In an embodiment, the other data stream comprises another order that if matched would reduce trading risk.

In an embodiment, the other order comprises a sell order that if matched would increase the amount of equity in a margin trading account.

In an embodiment, the other order comprises either one of a cancel order and a sell order.

An embodiment is configured to generate the other order that if matched would reduce trading risk.

An embodiment is configured to retrieve the other order from the data stream and insert the order so retrieved into the other data stream.

An embodiment is configured to retrieve, after commencing to transmit the other data stream, the other order from the data steam.

In an embodiment, the other order is modified before being inserted into the other data stream.

In an embodiment, processing at least the plurality of orders carried by the data stream to determine trading risk information comprises processing at least one of market data, the plurality of orders carried by the data stream, and trading account information to determine trading risk information indicative of the trading risk.

An embodiment is configured to:
process at least the other order to determine other trading risk information indicative of trading risk;
determine if the trading risk indicated by the other trading risk information satisfies another trading risk condition; and
cease transmitting the other data stream if the other trading risk condition is determined to be satisfied and commence transmitting the data stream.

In an embodiment, the trading risk condition and the other trading risk condition have dissimilar thresholds.

In an embodiment, the other data stream is arranged to maintain a connection between the system and the market configured for electronic trading.

In an embodiment, the other data stream comprises a heartbeat synchronous with a heat beat of the data stream.

In an embodiment, the other data stream is synchronised with the data stream.

In an embodiment, the data stream comprises a line encoded data steam and the other data stream comprises another line encoded data stream.

In an embodiment, the trading risk condition comprises at least one of:
the amount of equity in a margin trading account is less than a minimum equity amount;
the amount of equity in the margin trading account would be less than the minimum equity amount if at least one of the plurality of orders were matched;
a quantity of securities indicated by at least one of the plurality of orders exceeds a security quantity limit;
a financial value of at least one of the plurality of orders exceeds a financial value limit;
at least one of the plurality of orders is indicative of a proscribed security;
a quantity of open orders exceeds a maximum quantity of open orders;
market data indicates that the market does not have a predetermined quality;

the plurality of orders are received in a period and the number of the plurality of orders exceed a maximum allowable number for the period; and at least one of the plurality of orders is invalid.

An embodiment comprises:

a receiver for receiving the data stream;

a transmitter for transmitting the data stream;

reconfigurable circuitry having a first configuration for communicating the data stream carrying the plurality of orders from the receiver to the transmitter, and a second configuration for communicating the other data stream to the transmitter; and a controller configured to process at least the plurality of orders carried by the data stream to determine trading risk information indicative of the trading risk, determine if the trading risk indicated by the trading risk information satisfies a trading risk condition, and if the trading risk condition is determined to be satisfied then trigger reconfiguration of the reconfigurable circuitry.

In an embodiment, the controller is configured to extract the plurality of orders from the data stream.

In an embodiment, the first configuration has a data stream path connecting the receiver and the transmitter.

In an embodiment, the data stream path comprises a data stream delay element.

In an embodiment, the data stream path has a latency of less than at least one of: 1 clock cycle; substantially the number of clock cycles it takes to determine the trigger condition; substantially the number of clock cycles in a payload; and the number of clock cycles required to synchronise the other parallel data stream.

An embodiment comprises a data stream generator configured to generate the other data stream, wherein the second configuration is for communicating the other data stream from the data stream generator to the transmitter.

In an embodiment, the data stream generator comprises a block generator.

In an embodiment, the block generator is configured to generate at least one block.

In an embodiment, the data generator comprises a block aligner configured to give the at least one block the same block alignment as a plurality of blocks of the data stream.

An embodiment comprises a synchroniser configured to compare the data stream and the other data stream and send synchronisation information generated thereby to the data generator which is configured to synchronise the other data stream and the data stream using the synchronisation information.

In an embodiment, the data generator is configured to use the synchronisation information in generating the other data stream such that a protocol rule is not violated when the reconfigurable circuitry is reconfigured between the first configuration and the second configuration.

In an embodiment, the synchroniser comprises a block scrambling synchroniser configured for synchronising the scrambling of the other data stream and the data stream at the transmitter.

In an embodiment, the synchroniser comprises a clock recovery system configured to recover the data stream's clock period, and the data stream generator being configured to give the other data stream the clock period.

An embodiment comprises a logic device having the controller.

An embodiment comprises a logic device having at least one of the data stream generator and the controller.

An embodiment comprises a logic device having at least one of the controller, the data stream generator, and the synchroniser.

An embodiment comprises a logic device having at least one of the controller, the data stream generator, the synchroniser, and the clock recovery system.

In an embodiment, the logic device comprises at least one of a field programmable gate array (FPGA), an application specific integrated circuit (ASIC), and a complex programmable logic device (CPLD).

In an embodiment, the reconfigurable circuitry comprises a switch.

In an embodiment, the switch comprises a crosspoint switch.

An embodiment comprises:

a deserialiser for de-serialising the data stream to generate a raw parallel data stream carrying the plurality of orders and a serialiser for serialising the raw parallel data stream;

a parallel data generator configured to generate the other data stream;

reconfigurable circuitry having a first configuration for communicating the raw parallel data stream to the serialiser, and a second configuration for communicating the other raw parallel data stream to the serialiser; and a controller configured to process at least the plurality of orders to determine trading risk information indicative of the trading risk, determine if the trading risk indicated by the trading risk information satisfies a trading risk condition, and if the trading risk condition is determined to be satisfied then trigger reconfiguration of the reconfigurable circuitry.

In an embodiment, the controller is configured to extract the plurality of orders from the data stream.

In an embodiment, the controller is configured to trigger the reconfiguration of the reconfigurable circuitry from the first configuration to the second configuration.

In an embodiment, in the first configuration the reconfigurable circuitry has a raw parallel data stream path that connects the serialiser and deserialiser for communicating the raw parallel data stream to the serialiser, and in the second configuration the parallel data generator is in communication with the serialiser for communicating the other parallel data stream to the serialiser.

In an embodiment, the raw parallel data stream path comprises a raw parallel data stream delay element.

In an embodiment, the raw parallel data stream delay element comprises at least one register.

In an embodiment, the raw parallel data stream path has a latency of less than at least one of: 1 clock cycle of the data stream; substantially the number of clock cycles of the data stream it takes to determine the trigger condition; substantially the number of clock cycles of the data stream in a payload; and the number of clock cycles of the data stream required to synchronise the other parallel data stream.

An embodiment comprises a synchroniser configured to generate synchronisation information from the data stream and send the synchronisation information to the data generator which synchronises the other data stream and the data stream using the synchronisation information.

In an embodiment, the parallel data generator comprises a block generator configured to generate at least one block.

In an embodiment, the parallel data generator comprises a block aligner configured to use the synchronisation information to give the at least one block of the other raw parallel data stream the same block alignment as a plurality of blocks of the raw parallel data stream.

In an embodiment, the parallel data generator comprises a block scrambling synchroniser configured to use the synchronisation information to synchronise the scrambling of the other raw parallel data stream and the raw parallel data stream at the serialiser.

In an embodiment, the parallel data generator is configured to give the other data stream a clock period recovered from the data stream by the deserialiser.

An embodiment comprises a logic device having at least one of the serialiser, the deserialiser, the parallel data generator, the reconfigurable circuitry and the controller.

An embodiment comprises a logic device having at least one of the serialiser, the deserialiser, the parallel data generator, the reconfigurable circuitry, the controller, and the synchroniser.

An embodiment comprises a logic device having at least one of the serialiser, the deserialiser, the parallel data generator, the reconfigurable circuitry, the controller, the synchroniser, the block aligner and the block scrambling synchroniser.

In an embodiment, the logic device comprises at least one of a field programmable gate array (FPGA), an application specific integrated circuit (ASIC), and a complex programmable logic device (CPLD).

In an embodiment, the parallel data generator is configured to use the synchronisation information in generating the other raw parallel data stream such that a protocol rule is not violated when the reconfigurable circuitry is reconfigured between the first configuration and the second configuration.

An embodiment is configured to simultaneously receive the data stream, transmit the data stream and process at least the plurality of orders to determine if the trading risk indicated by the trading risk information satisfies a trading risk condition.

Disclosed herein is a method for transmitting a data stream. The method comprises the step of receiving the data stream. The data stream carries a plurality of orders that are destined for a market configured for electronic trading. The method comprises the step of transmitting the data stream. The method comprises the step of processing at least the plurality of orders to determine trading risk information indicative of a trading risk. The method comprises the step of determining if the trading risk indicated by the trading risk information satisfies a trading risk condition. The method comprises the step of ceasing transmission of the data stream if the trading risk condition is determined to be satisfied and commencing transmission of another data stream destined for the market.

In an embodiment, the other data stream comprises another order that if matched would reduce trading risk.

In an embodiment, the other order comprises a sell order that if matched would increase the amount of equity in a margin trading account.

In an embodiment, the other order comprises either one of a cancel order and a sell order.

An embodiment comprises the step of generating the other order that if matched would reduce trading risk.

An embodiment comprises the step of retrieving the other order from the data stream and inserting the order so retrieved into the other data stream.

An embodiment comprises the step of retrieving, after commencing transmission of the other data stream, the other order from the data stream.

An embodiment comprises the step of modifying the other order before being inserted into the other data stream so that, if matched, trading risk is reduced.

In an embodiment, processing at least the plurality of orders carried by the data stream to determine trading risk information comprises processing at least one of market data, the plurality of orders carried by the data stream, and trading account information to determine trading risk information indicative of the trading risk.

An embodiment comprises the steps of:
processing at least the other order to determine other trading risk information indicative of trading risk;
determining if the trading risk indicated by the other trading risk information satisfies another trading risk condition; and
cease transmitting the other data stream if the other trading risk condition is determined to be satisfied and commence transmitting the data stream.

In an embodiment, the trading risk condition and the other trading risk condition have dissimilar thresholds.

In an embodiment, the other data stream is arranged to maintain a connection.

In an embodiment, the other data stream comprises a heartbeat synchronous with a heat beat of the data stream.

An embodiment comprises the step of synchronising the other data stream with the data stream.

In an embodiment, the data stream comprises a line encoded data steam and the other data stream comprises another line encoded data stream.

In an embodiment, the trading risk condition comprises at least one of:
the amount of equity in a margin trading account is less than a minimum equity amount;
the amount of equity in the margin trading account would be less than the minimum equity amount if at least one of the plurality of orders were matched;
a quantity of securities indicated by at least one of the plurality of orders exceeds a security quantity limit;
a financial value of at least one of the plurality of orders exceeds a financial value limit;
at least one of the plurality of orders is indicative of a proscribed security;
a quantity of open orders exceeds a maximum quantity of open orders;
market data indicates that the market does not have a predetermined quality;
the plurality of orders are received in a period and the number of the plurality of orders exceed a maximum allowable number for the period; and
at least one of the plurality of orders is invalid.

In an embodiment:
the step of receiving the data stream comprises the step of a receiver receiving the data stream;
the step of transmitting the data stream comprises the step of a transmitter transmitting the data stream;
the step of ceasing transmitting the data stream and commencing transmitting the other data stream comprises the step of reconfiguring reconfigurable circuitry from a first configuration for communicating the data stream from the receiver to the transmitter to a second configuration for communicating the other data stream to the transmitter; and
the steps of processing at least the plurality of orders to determine trading risk information indicative of a trading risk and determining if the trading risk indicated by the trading risk information satisfies a trading risk condition comprises the step of a controller processing at least the plurality of orders carried by the data stream to determine trading risk information indicative of the trading risk, and the controller determining if the trading risk information satisfies a trading risk condition, and if the trading risk condition is determined to be satisfied then the controller triggering reconfiguration of the reconfigurable circuitry.

An embodiment comprises the step of the controller extracting the plurality of orders from the data stream.

In an embodiment, the first configuration has a data stream path connecting the receiver and the transmitter.

An embodiment comprises the step of delaying the data stream at the data stream path.

An embodiment comprises the step of delaying the data stream between the receiver and the transmitter by less than at least one of: 1 clock cycle; substantially the number of clock cycles it takes to determine the trigger condition; substantially the number of clock cycles in a payload; and the number of clock cycles required to synchronise the other parallel data stream.

An embodiment comprises the step of generating the other data stream with a data stream generator.

In an embodiment, the step of generating the other data stream comprises the step of generating at least one block.

In an embodiment, the step of generating the other data stream comprising the step of giving the at least one block the same block alignment as a plurality of blocks of the data stream.

An embodiment comprises the step of comparing the data stream and the other data stream to generate synchronisation information and synchronising the other data stream and the data stream using the synchronisation information.

An embodiment comprises the step of using the synchronisation information to generate the other data stream such that a protocol rule is not violated when the reconfigurable circuitry is reconfigured between the first configuration and the second configuration.

An embodiment comprises the steps of using the synchronisation information to synchronise the scrambling of the other data stream and the data stream at the transmitter.

In an embodiment, the controller is in a logic device.

In an embodiment, at least one of the controller and the data stream generator is in a logic device.

In an embodiment, at least one of the controller and the data stream generator is in a logic device, and the steps of comparing the data stream and the other data stream to generate synchronisation information and synchronising the other data stream and the data stream using the synchronisation information are performed within the logic device.

In an embodiment, the logic device comprises at least one of a field programmable gate array (FPGA), an application specific integrated circuit (ASIC), and a complex programmable logic device (CPLD).

In an embodiment, the step of reconfiguring the reconfigurable circuitry comprises the step of operating a switch of the reconfigurable circuitry.

In an embodiment, the step of operating a switch of the reconfigurable circuitry comprises the step of operating a crosspoint switch of the reconfigurable circuitry.

An embodiment comprises the step of recovering the data stream's clock period, and giving the other data stream the clock period.

An embodiment comprises the steps of:
a deserialiser de-serialising the data stream to generate a raw parallel data stream carrying the plurality of orders and a serialiser serialising the raw parallel data stream; and
a parallel data generator generating the other data stream;

wherein the steps of processing at least the plurality of orders to determine trading risk information indicative of a trading risk and determining if the trading risk indicated by the trading risk information satisfies a trading risk condition comprise a controller processing at least the plurality of orders to determine the trading risk information, and the controller determining if the trading risk indicated by the trading risk information satisfies a trading risk condition, wherein the step of ceasing transmission of the data stream and commencing transmission of the other data stream comprise the steps of the controller, in response to determining that the trading risk condition is satisfied, triggering reconfiguration of reconfigurable circuitry between a first configuration for communicating the raw parallel data stream to the serialiser and a second configuration for communicating the other raw parallel data stream to the serialiser.

An embodiment comprises the step of the controller extracting the plurality of orders from the data stream.

An embodiment comprises the step of the controller triggering the reconfiguration of the reconfigurable circuitry from the first configuration for communicating the raw parallel data stream to the serialiser to the second configuration for communicating the other raw parallel data stream to the serialiser.

In an embodiment, in the first configuration the reconfigurable circuitry has a raw parallel data stream path that connects the serialiser and deserialiser for communicating the raw parallel data stream to the serialiser, and in the second configuration the parallel data generator is in communication with the serialiser for communicating the other parallel data stream to the serialiser.

In an embodiment, the raw parallel data stream delay element comprises at least one register.

In an embodiment, the raw parallel data stream path has a latency of less than at least one of: 1 clock cycle of the data stream; substantially the number of clock cycles of the data stream it takes to determine the trigger condition; substantially the number of clock cycles of the data stream in a payload; and the number of clock cycles of the data stream required to synchronise the other parallel data stream.

An embodiment comprises the step of generating synchronisation information from the data stream and synchronising the data stream and the other data stream using the synchronisation information.

An embodiment comprises the step of a block generator of the parallel data generator generating at least one block and a block aligner of the parallel data generator using the synchronisation information to give the at least one block the same block alignment as a plurality of blocks of the raw parallel data stream.

In an embodiment, a block scrambling synchroniser of the parallel data generator uses the synchronisation information to synchronise the scrambling of the other raw parallel data stream and the raw parallel data stream at the serialiser.

An embodiment comprises the step of giving the other data stream a clock period recovered from the data stream.

In an embodiment, at least one of the deserialiser, the serialiser, the parallel data generator, the controller, and the reconfigurable circuitry are in a logic device.

In an embodiment, at least one of the deserialiser, the serialiser, the parallel data generator, the controller, and the reconfigurable circuitry are in a logic device, and the step of generating synchronisation information is performed in the logic device.

In an embodiment, at least one of the deserialiser, the serialiser, the parallel data generator, the controller, the block generator, the block aligner, the block scrambling synchroniser and the reconfigurable circuitry are in a logic device, and the step of generating synchronisation information is performed in the logic device.

In an embodiment, the logic device comprises at least one of a field programmable gate array (FPGA), an application specific integrated circuit (ASIC), and a complex programmable logic device (CPLD).

In an embodiment, the parallel data generator is configured to use the synchronisation information in generating the other raw parallel data stream such that a protocol rule is not violated when the reconfigurable circuitry is reconfigured between the first configuration and the second configuration.

In an embodiment, the steps of receiving the data stream, transmitting the data stream, and processing at least the plurality of orders to determine trading risk information indicative of a trading risk condition are performed simultaneously.

Disclosed herein is non-transitory processor readable tangible media including program instructions which when executed by a processor causes the processor to perform a method disclosed above.

Disclosed herein is a computer program for instructing a processor, which when executed by the processor causes the processor to perform a method disclosed above.

Any of the various features of each of the above disclosures, and of the various features of the embodiments described below, can be combined as suitable and desired.

BRIEF DESCRIPTION OF THE FIGURES

Embodiments will now be described by way of example only with reference to the accompanying figures in which.

DESCRIPTION OF EMBODIMENTS

Figure 1:
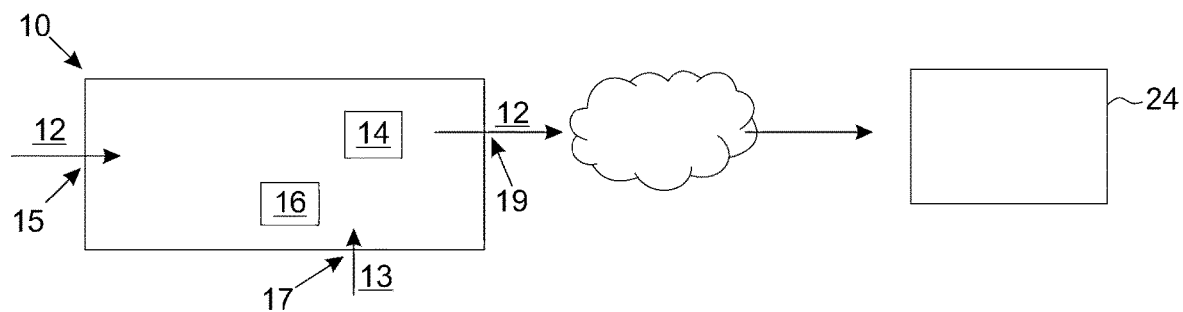
FIG. 1 shows a schematic diagram of an embodiment of a system for transmitting a data stream.
Figure 2:
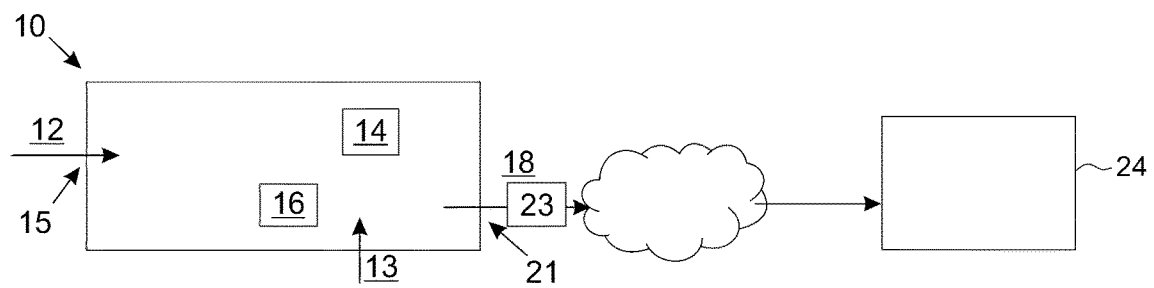
FIG. 2 shows the system of FIG. 1 transmitting another data stream destined for the electronic market.

FIG. 1 shows a schematic diagram of an embodiment of a system for transmitting a data stream, the system being indicated by the numeral 10. The system 10 is configured to receive the data stream 12. The data stream 12 carries a plurality of orders that are destined for a market 24 configured for electronic trading ("electronic market"). The system 10 is configured to transmit the data stream 12 carrying the plurality of orders. The system 10 is configured to process at least the plurality of orders 12 to determine trading risk information 14 indicative of trading risk. The system 10 is configured to determine if the trading risk indicated by the trading risk information 14 satisfies a trading risk condition 16. The system 10 is configured to cease transmitting the data stream 12 carrying the plurality of orders if the trading risk condition is determined to be satisfied and commenced transmitting another data stream 18 destined for the electronic market, as shown in FIG. 2.

The electronic market may be, for example, an exchange, an alternative trading system, a dark pool, or generally any suitable electronic market. The electronic market may generally, but not necessarily, be configured to receive the plurality of orders which may be in the form of electronic information indicative of the orders. The data stream 12 is in this embodiment in the form of a network traffic stream 12 transmitted over a network medium, otherwise known as a network stream 12.

Generally, for example in the present but not all embodiments, the system is configured to simultaneously receive the network stream 12, transmit the network stream 12 and process at least the plurality of orders to determine if the trading risk indicated by the trading risk information satisfies a trading risk condition. That is, the system executes a plurality of parallel operations. It is to be understood that processing or the plurality of orders may not mean that the plurality of orders are all processed simultaneously, but includes for example the sequential processing of the plurality of orders during simultaneous receipt and transmission of the network stream 12. Instead of storing and forwarding each of the orders, and determining trading risk during storage, the network stream 12 is cut through the system 10. Trade risk checking may consequently generally not be performed post-trade, but pre-trade. The parallel operations may reduce the latency of the plurality of orders being sent to the market, and may still provide determination and control of trading risk. Generally, for example in the present but not all embodiments, the system is configured to simultaneously receive the network stream and commence transmitting the other data stream 18 ("other network stream") in place of the network stream 12. The system 10 may continue to receive, and may monitor, the network stream 12 while transmitting the other network stream 18.

The plurality of orders may be for, for example, shares, futures, options, bonds, foreign exchange, contracts for difference (CFDs), derivatives, foreign exchange, commodities (for example a grain, a mineral or generally any suitable commodity), or generally any suitable financial instrument. The plurality of orders may comprise, for example, buy orders (bids), sell orders (offers), immediate or cancel (IOC) orders, stop orders, or generally any type of suitable order.

The other data stream 18 may comprise another order 23 that, if matched, would reduce trading risk. For example, the other order may comprise a sell order that it matched would increase the amount of equity in a margin trading account for a person responsible for the orders. The other order 23 may comprise a cancel order to cancel an order received by an electronic market but not yet matched. The other order 23 may be a buy order, for example if a trader was taking a short position. The other data stream 18 may be data stream 12 but without an order determined to have an associated trading risk.

The system 10 is configured to generate the other order 18 that, if matched, would reduce trading risk, that is at least in part reverse the client's or trader's position. In an alternative embodiment, however, the other order 23 may be generated by another system or device and the other order 23 may be subsequently communicated to the system 10.

The other order 23 may, however, be retrieved from the data stream 12 by the system 10, which is configured to do so. The system 10 may insert the other order 23 so retrieved into the other data stream 18. For example, the system 10 may be configured to retrieve only those of the plurality of orders that are sell orders. Generally, but not necessarily, the other order 23 is retrieved and inserted into the other data stream 18 after transmission of the other data stream 18 has commenced.

The retrieved order 23 may be modified before being inserted into the other data stream 18. For example, if the number of financial instruments specified by the order 23 is determined to satisfy the risk condition, then the number of financial instruments specified in the order may be reduced prior to being inserted into the other data stream 18.

In determining the trading risk information 14, the system 10 may process only the plurality of orders 12 to determine the trading risk information 14. This may not be, however, a sufficiently sophisticated approach to satisfactorily determine the trading risk information 14. The system 10, but not necessarily all embodiments, processes other data 13 in the form of market data in addition to the plurality of orders (or instead of the plurality of orders) to determine the trading risk information 14. The system 10 may additionally or alternatively process trading account information, for example the margin of the trading account, to determine the trading risk information 14.

The system 10 is configured to recommence transmission of the data stream 12 if the trading risk is reduced to an acceptable level. The system 10 may process at least the other order 23 to determine other trading risk information indicative of trading risk. The system 10 is configured to determine if the trading risk indicated by the other trading risk information satisfies another trading risk condition. The system 10 is configured to cease transmission of the other data stream 18 if the other trading risk condition is determined to be satisfied and commence transmission of the data stream 12.

Generally, but not necessarily, the trading risk condition and the other trading risk condition have dissimilar thresholds. For example, the risk condition may be that risk is greater than a first number of risk units, and the other risk condition may be that the risk is less than a second number of risk units, the second number being less than the first number.

The data streams 12,18 are generally but not necessarily communicated by in a computer network. The data streams 12,18 may be transmitted along a network medium. The network medium may generally be in the form of a network cable in the form of an optical fibre network cable, an electrical network cable (for example a copper network cable, twinaxial network cable, twisted pair), or additionally or alternatively wirelessly transmitted. Generally, switching from the one source of data to the other source of data when the source of data is interrupted may cause a communications error, which may not be desirable. The system 10 has input ports 15, 17 for receiving data streams 12 and 13, the input ports comprising receivers in the form of Ethernet receivers. The system 10 has output ports 19, 21 for transmitting the data stream 12 and the other data stream 18, the output ports comprising transmitters in the form of Ethernet transmitters. The input ports 15, 17 and the output ports 19, 21 are each configured for receiving an end of a network cable. The ports may each comprise a respective Ethernet transceiver. Embodiments of systems described herein may not cause a communications error when the reconfigurable circuitry is reconfigured between the first configuration and the second configuration.

The other data stream 18 is arranged to maintain a connection between the system 10 and the market 24 configured for electronic trading, when the data stream transmission ceases and the other data stream transmission commences, or visa versa. The system 10 is configured to synchronise the other data stream 18 with the data stream 12. Synchronisation may prevent the electronic market from disconnecting from the system 10 or prevent the triggering a handshaking protocol (for example a TCP 3-way handshake) or generally any unwanted behaviour when the system 10 stops transmitting the data stream 12 and starts transmitting the other data stream 18. For example, the other data stream 18 has, in this but not all embodiments, a heartbeat that is synchronous with a heartbeat of the data stream 12. The heartbeat is a periodic signal generated by system 10 to indicate normal operation to the electronic market 24 and/or or to synchronise communications between the system 10 and the electronic market 24.

The data stream 12 and the other data stream 18 may—as for the embodiment shown in FIGS. 1 and 2 but not necessarily in all embodiments each comprise a line encoded data stream. A line code is a code chosen for use within a communications system for transmitting a digital signal down a line or bus, for example for communication of data streams 12,18 along network cables.

The trading risk condition may comprise at least one of:
the amount of equity in a margin trading account is less than a minimum equity amount;
the amount of equity in the margin trading account would be less than the minimum equity amount if at least one of the plurality of orders were matched;
a quantity of securities indicated by at least one of the plurality of orders exceeds a security quantity limit;
a financial value of at least one of the plurality of orders exceeds a financial value limit;
at least one of the plurality of orders is indicative of a proscribed security;
a quantity of open orders exceeds a maximum quantity of open orders;
market data indicates that the market does not have a predetermined quality;
the plurality of orders are received in a period and the number of the plurality of orders exceed a maximum allowable number for the period; and
at least one of the plurality of orders is invalid.

Generally, the risk condition is not limited to comprising the above listed examples and may additionally or alternatively include consideration of generally any type of risk or combination of risk types, including but not limited to the examples of asset-backed risk, including changes in interest rates and term modifications, credit risk including the risk of a borrower going into default, foreign investment risk, liquidity risk including the risk that a given security or asset cannot be traded quickly enough in an electronic market to prevent loss, market risk including the risk that stock prices may change and the risk that interest rates may change, currency risks including the risk that foreign exchange rate may change, commodity risk including the risk that commodity prices may change, operational risk or generally any applicable type of risk whether or not described by portfolio theory.

The risk information may be, for example, determined by a worst-case risk calculation. A worst-case risk calculation may involve, for example, calculating the sum of the value of the plurality of orders transmitted by the system and/or executed by the market. This conservative approach is, in the opinion of the applicant, unlikely to underestimate the risk associated with execution of the orders. Summing the value of the orders may be relatively simple and rapidly completed and may not impede the rate at which the gateway 14 is able to process orders received from the client 20 for forwarding to the market.

In one example, the system 10 sends an order to the market to sell 500 JP Morgan shares. Sometime later, the system 10 sends another order (originally from the same client) to the market to buy 400 JP Morgan shares. As described above, the system 10 determines a risk associated with the sale of the 500 JP Morgan shares and the purchase of 400 JP Morgan shares to have a value equivalent to the sum of the sale and the purchase, that is a value approximately all equal to that of 900 JP Morgan shares. The calculation of risk by the system 10, however, may at least in part offset the risk associated with the sale of 400 of the 500 sold JP Morgan shares against the risk associated with the purchase of the 400 JP Morgan shares.

In another example, the system 10 sends an order to the market to buy 500 BHP BILLITON ("BHP") shares and subsequently sends another order to sell 500 Rio Tinto shares. The system 10 may calculate the risk to be the value of the 500 BHP shares and also the value of the 500 Rio Tinto shares. The calculation, however, may account for the relatively strong correlation in price movements of BHP shares and Rio Tinto shares and thus offsets at least some of the risks associated with the two transactions. The calculation may be a Value At Risk (VaR) calculation, to determine the offset amount.

It will be appreciated that risk may be expressed and calculated in many ways. For example, risk may be estimated by naïvely summing the currency amount associated with each order. This may require conversion between currency units and risk units. A margin limit method may be used, which may include offsets associated with offset rules of a particular counter-party such as an exchange or clearing organisation. The risk may include margin limits, which may involve using a model of margins required by the order destination rules to ensure cash levels are appropriately funded in the destination accounts. Risk models that offset correlations may be used, such as Value at Risk (VAR). Risk may be expressed by financial risk factors known by Greek letters ("the Greeks"), for example rho (interest rate risk), vega (volatility risk), theta (time decay risk), delta (the risk relating to the underlying market moving), and gamma (the risk related to delta changing).

Risk may be calculated by the system using a RiskMetrics™ framework, or any other suitable framework. Generally, any type of risk may be accommodated by the system 10 and any method of calculating or estimating risk may be used as suitable. A third party risk algorithm may be used. The risk may be determined using an application program interface (API), for example.

Figure 3:
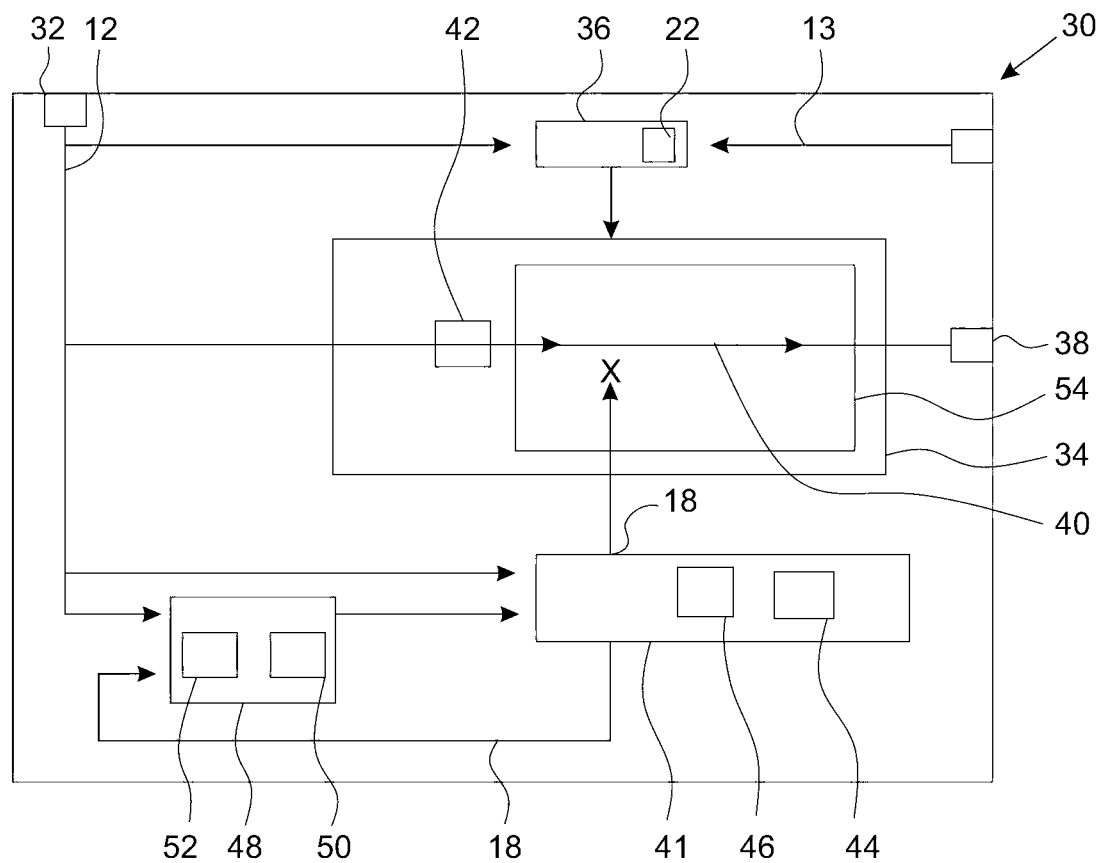
FIGS. 3 and 4 show schematic diagrams of another embodiment of a system for transmitting a data stream.
Figure 4:
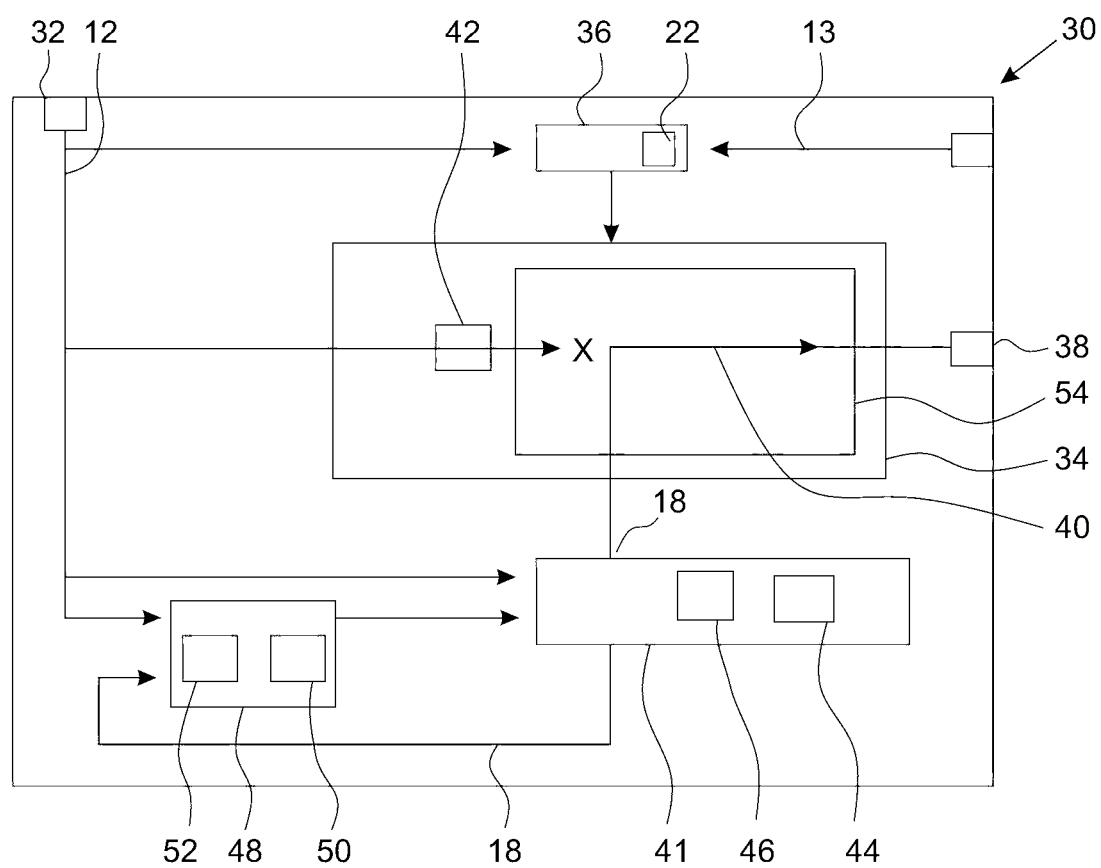

FIG. 3 shows a schematic diagram of another embodiment of a system 30 for transmitting a data stream. The system 30 has a receiver 32 for receiving the data stream 12. The system 30 has a transmitter 38 for transmitting the data stream 12. The system 30 has reconfigurable circuitry 34. The reconfigurable circuitry 34 has a first configuration for communicating the data stream 12 carrying the plurality of orders from the receiver 32 to the transmitter 38. In the first configuration, the reconfigurable circuitry 34 has a data stream path 40 connecting the receiver 32 and the transmitter 38. The reconfigurable circuitry 34 is shown having the first configuration in FIG. 3. FIG. 4 shows the schematic diagram of the system 30 wherein the reconfigurable circuitry 34 is shown having a second configuration. The second configuration is for communicating the other data stream 18 to the transmitter 32. The system 30 has a controller 36. The controller 36 is configured to process at least the plurality of orders carried by the data stream 12 to determine trading risk information indicative of the trading risk. The controller 36 is configured to determine if the trading risk indicated by the trading risk information satisfies a trading risk condition, and if the trading risk condition is determined to be satisfied then trigger reconfiguration of the reconfigurable circuitry 34. The controller 36 is configured to extract the plurality of orders from the data stream 12.

The data stream path 40 has a data stream delay element 42. The data stream path 40 has a latency of less than at least one of 1 clock cycle; substantially the number of clock cycles it takes to determine the trigger condition; substantially the number of clock cycles in a payload; and the number of clock cycles required to synchronise the other parallel data stream.

The system 30 has a data stream generator 41 configured to generate the other data stream 18. The second configuration is for communicating the other data stream 18 from the data stream generator 41 to the transmitter 38. The data stream generator 40 comprises a block generator 44. The block generator 44 is configured to generate at least one block. The data generator comprises a block aligner 46 configured to give the at least one block the same block alignment as the plurality of blocks of the data stream 12.

The system 30 has a synchroniser 48 that is configured to compare the data stream 12 and the other data stream 18 and send synchronisation information generated thereby to the data generator 41. The data generator 41 is configured to synchronise the other data stream 18 and the data stream 12 using the synchronisation information. The synchronisation information is used by the data generator 40 to generate the other data stream 18 such that a protocol rule is not violated when the reconfigurable circuitry 34 is reconfigured between the first configuration and the second configuration.

The synchroniser 48 comprises a block scrambling synchroniser 50. The block scrambling synchroniser 50 is configured for synchronising the scrambling of the other data stream 18 and the data stream 12 at the transmitter 38. The synchroniser also comprises a clock recovery system 52 configured to recover the data stream's clock period. The data stream generator 41 is configured to give the other data stream 18 the clock period.

In this embodiment, the system 300 comprises a logic device that has the controller 36, the data stream generator 41, the synchroniser 48, and may have any other modules having functions described herein. Other embodiments, however, may only have a subset of these modules on the logic device. In this embodiment, the logic device is in the form of a field programmable gate array (FPGA), however in other embodiments it may take the form of an application specific integrated circuit (ASIC), a complex programmable logic device (CPLD) or generally any suitable form of logic device. The reconfigurable circuitry 34 comprises a switch 54 in the form of a crosspoint switch.

The system 30 has a trading risk information registry 22. The trading risk information registry 22 stores the trading risk information 14. The trading risk information registry 22 may take the form of a data structure in memory, examples of which include but are not limited to: an integer or real variable in RAM, a register, or any other suitable form of volatile or nonvolatile memory, and record structure in RAM, or generally any other suitable form of memory. The trading risk information registry 22 may not necessarily be at the system 10. The trading risk information registry 22 may be separate and even remote and be in communication with the system 10. The system 20 is configured such that the trading risk information registry 22 is continually updated as each of the plurality of orders are received by the system.

Figure 5:
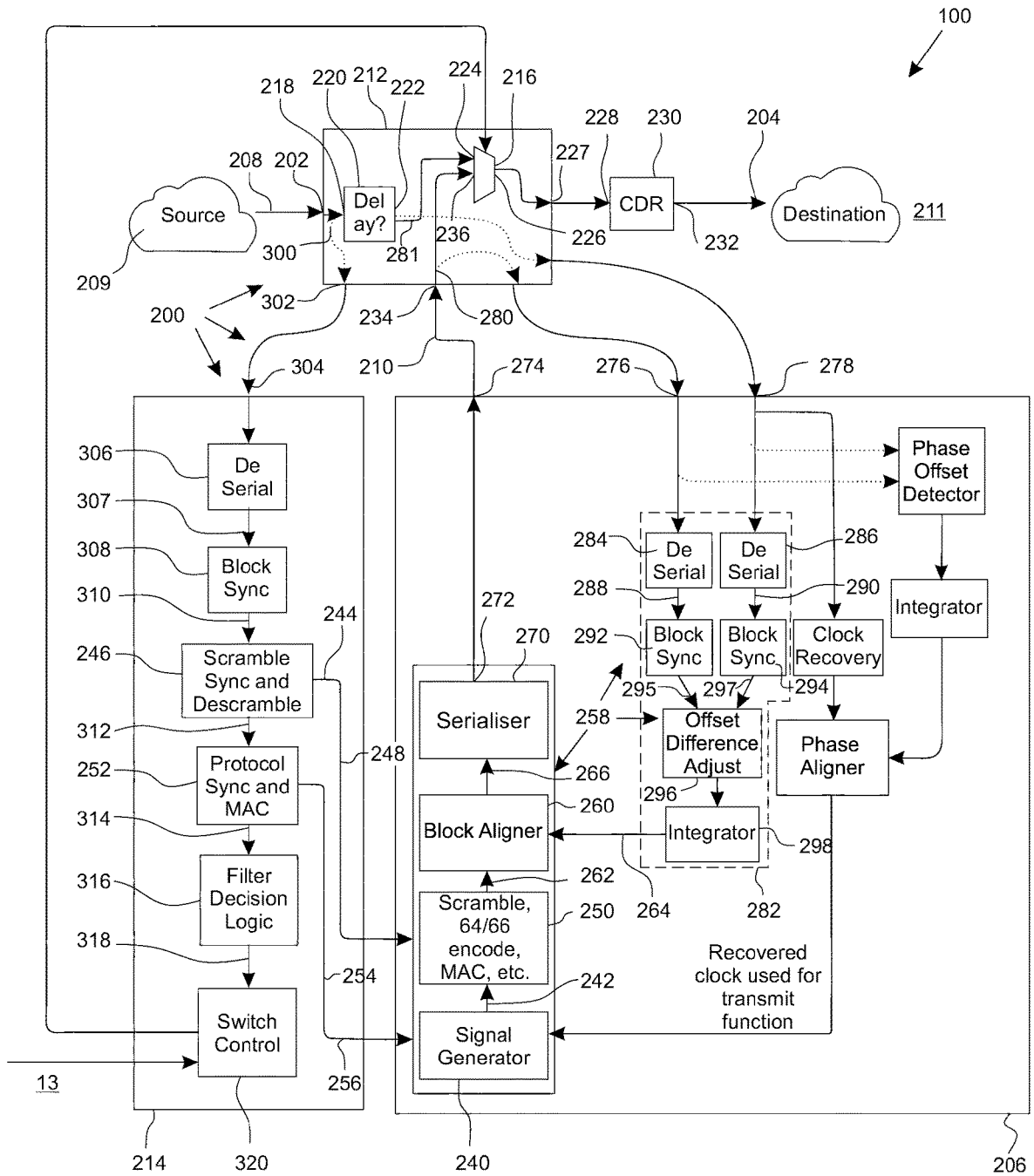
FIG. 5 shows a schematic diagram of another embodiment of a system for transmitting a data stream.

FIG. 5 shows a schematic diagram of another embodiment of a system 100 for transmitting a data stream 208. The system 100 has an input 202 in the form of a receiver for receiving the line encoded data stream 208. The data stream 208 carries a plurality of orders that are destined for a market 24 configured for electronic trading ("electronic market"). The system 100 also has an output 204 for transmitting the line encoded data stream 208 carrying the plurality of orders. The system has a data generator 206 in the form of a data stream generator, which is configured to generate another data stream 210. The system 100 has reconfigurable circuitry 212 that in a configuration is configured to communicate the line encoded data stream 208 to the output 204. In another configuration, the reconfigurable circuitry 212 is configured to communicate the other data stream to the output 204. The system 100 has a controller 214 that is configured to confirm satisfaction of a trigger condition, and subsequently trigger reconfiguration of the reconfigurable circuitry 212. The data generator 206 is configured for the other data stream 210 to be synchronised to the line encoded data stream 208 at the output 204. That is, at least one of following properties of the data stream at the output are preserved by reconfiguration of the reconfigurable circuitry: The block alignment, the block scrambling sequence, and the data stream input's clock.

The system 100 is configured to:
process at least the plurality of orders to determine trading risk information indicative of trading risk;
determine if the trading risk indicated by the trading risk information satisfies a trading risk condition;
cease transmitting the data stream carrying the plurality of orders if the trading risk condition is determined to be satisfied and commence transmitting another data stream destined for the electronic market.

The reconfigurable circuitry 212 comprises a switch 216 that facilitates the reconfiguration of the reconfigurable circuitry 212. In the configuration, the switch 216 is configured such that a line encoded data stream path is established between input 202 and the output 204, via input 218 of optional delay line 220, the output 222 of optional delay line 220, input 224 of switch 216, output 226 of switch 216, the output 227 of the reconfigurable circuitry 212, input 228 of optional clock and data recovery unit 230, and the output 232 of optional clock and optional recovery unit 230. Without the optional delay line 220 the input 202 is in communication with the input 224 of the switch 216. Without the optional clock and data recovery module 230, the output 227 of the reconfigurable circuitry 212 is in direct communication with the output 204. In the other configuration, the switch 216 is configured such that the output 204 is in communication with the data generator 206 for communicating the other data stream 210 to the output 204. Another data stream path is established between other input 234 of the reconfigurable circuitry 212, the other input 236 of the switch 216, the output 226 of the switch 216, the outputs 227 of the reconfigurable circuitry, the input 228 of the optional clock and data recovery unit 230, the output 232 of the optional clock and data recovery unit 230, and the output 204. Without the optional clock and data recovery unit 230, the output 227 of the reconfigurable circuitry 212 is in direct communication with the output 204.

In this embodiment, the system 100 has the delay line 220 electrically disposed between the input 202 of the reconfigurable circuitry 212 and the input 224 of the switch 216. The delay line 220 comprises a capacitive delay, a plurality of logic gates, a time-of-flight delay comprising copper or optical communications mechanism or a printed circuit board trace, a plurality of IODELAY elements in an FPGA. Generally, any suitable method to delay the signal by a consistent amount may be used.

The line encoded data stream path through switch 216 may have a latency of less than at least one of one clock cycle, substantially the number of clock cycles it takes to determine the trigger condition, substantially the number of clock cycles in a payload of a packet of the pine encoded data stream 208, and the number of clock cycles required to synchronise the other parallel data stream. The data generator 206 has a block generator 240. The block generator 240 may, but not necessarily, generate blocks that are to replace blocks within the line encoded data stream 208 at the output 204. The blocks 242 generated by the block generator 240 are to be synchronised to the line encoded data stream 208 at the output 204. Scrambling information 244 generated by a descrambling module 246 is communicated via conduit 248 to a scrambling module 250 of the data generator 206. The scrambling module 250 receives the blocks 242 via a conduit and synchronises the scrambling of the blocks 242 generated by the block generator 240 with the blocks of the line encoded data stream 208 at the output 204. The block generator 240 receives via conduit 256 protocol synchronisation and MAC information 254 from a protocol synchroniser and MAC module 252. The block generator 240 uses the protocol sync and MAC information 254 to emit blocks 242 which, when passed through the other encoding stages, will form a line encoded data stream which is protocol compliant with the line encoded data stream 281. The data generator 206 has block alignment circuitry 258, which comprises a block aligner 260. The block aligner 260 receives from the scrambling module 250 the scrambled blocks 262 via a conduit. The block aligner 260 receives via a conduit block offset information 264 generated by the block alignment circuitry 258. The block offset information is indicative of the block offset of the other data stream 210 relative to the line encoded data stream. The block aligner 260 of the block alignment circuitry 258 generates using the block offset information 264 a sequence of words 266 that each correspond to a respective block of the line encoded data stream 208. The sequence of words 266 are communicated via a conduit from the block aligner 260 to a serialiser 270. The output 272 of the serialiser 270 is in communication with the output 274 of the data generator 206 which is in turn in communication with the input 234 of the reconfigurable circuitry 212.

The block alignment circuitry 258 has a first input 276 and a second input 278. The first input 276 receives the data stream 210 via tap 280 in the reconfigurable circuitry 212. The second input 278 receives the line encoded data stream 208 via a tap in reconfigurable circuity 212. The block alignment circuitry 258 compares the data stream 210 and line encoded data stream 208 to generate the block offset information 264. Comparator 282 performs the comparison. The comparator 282 deserialises the data stream 210 and the line encoded data stream 208 in respective deserialisers 284 and 286. The outputs 288 and 290 of the deserialisers 284, 286 are received by block synchronisation modules 292 and 294 that determine the alignment of the blocks of the data stream 210 and the line encoded data stream 208. The output from the block synchronisation modules 292, 294, being block alignment information 295, 297 is received by an offset difference adjustment module 296 which generates offset adjustment information that is communicated via a conduit to integration unit 298 in the form of a proportional-integral-derivative controller, for example an I-type controller, that generates the block offset information 264 communicated to the block aligner 260.

The line encoded data stream 208 is communicated to the controller 214. A tap 300 within the reconfigurable circuitry 212 communicates the line encoded data stream 208 to an output 302 of the reconfigurable circuitry 212 in communication input 304 of the controller 214. The controller 214 then interrogates the line encoded data stream 208 received at 304. The line encoded data stream 208 received at input 304 is communicated via a conduit within the controller 214 to a deserialiser 306, the output 307 of which is communicated to a block synchronisation module 308 that determines the block offset of the line encoded data stream 208 and generates a sequence of words 310 that each correspond to a respective block of the line encoded data stream 308. The sequence of words 310 are communicated to a module 246 that has a 64b64b decoding module that descrambles the sequence of words. The descrambled sequence of words 312 is communicated via a conduit to the protocol synchronisation and MAC module 252 to retrieve the payload from the descrambled sequence of words 312. The payload 314 is communicated via a conduit to filter logic module 316, which determines if the information in the payload satisfies the trigger condition. If the filter logic module 316 determines that the information does indeed satisfied the trigger condition, then a trigger signal 318 generated by the filter decision logic causes the reconfigurable circuitry 212 to reconfigure. The trigger signal 318 is communicated via a conduit to a switch controller 320 that reconfigures the reconfigurable circuitry, and in particular the switch 216.

The source 209 of FIG. 5 may be a computer network, or a computer network cable thereof. The computer network may be in communication with client generating the electronic orders. Alternatively or additionally, (as may be the source for the other embodiments described herein as appropriate) be a low latency transmission path over which the line encoded data stream is transmitted. A low latency transmission path may be for trading financial instruments, for example; a plurality of financial instrument trading orders received by a financial market may be processed in the order that they were received. In one example, the low latency transmission path comprises a microwave transmission path. The data generator 206 may also receive the line encoded data stream via another transmission path in the form of a cable link.

A phase aligner may be used to try to align the bitstream's edges to the incoming bitstream's edges. The input to the phase aligner may be a comparison of the arrival time of edges on the recovered clocks in each of the deserialisation units. A CDR which is tolerant of slightly phase misalignments may be used after the crosspoint switch to recover the clock and re-align the data to a given clock. This may have a low latency overhead. This may allow a greater tolerance to phase misalignment.

Figure 6:
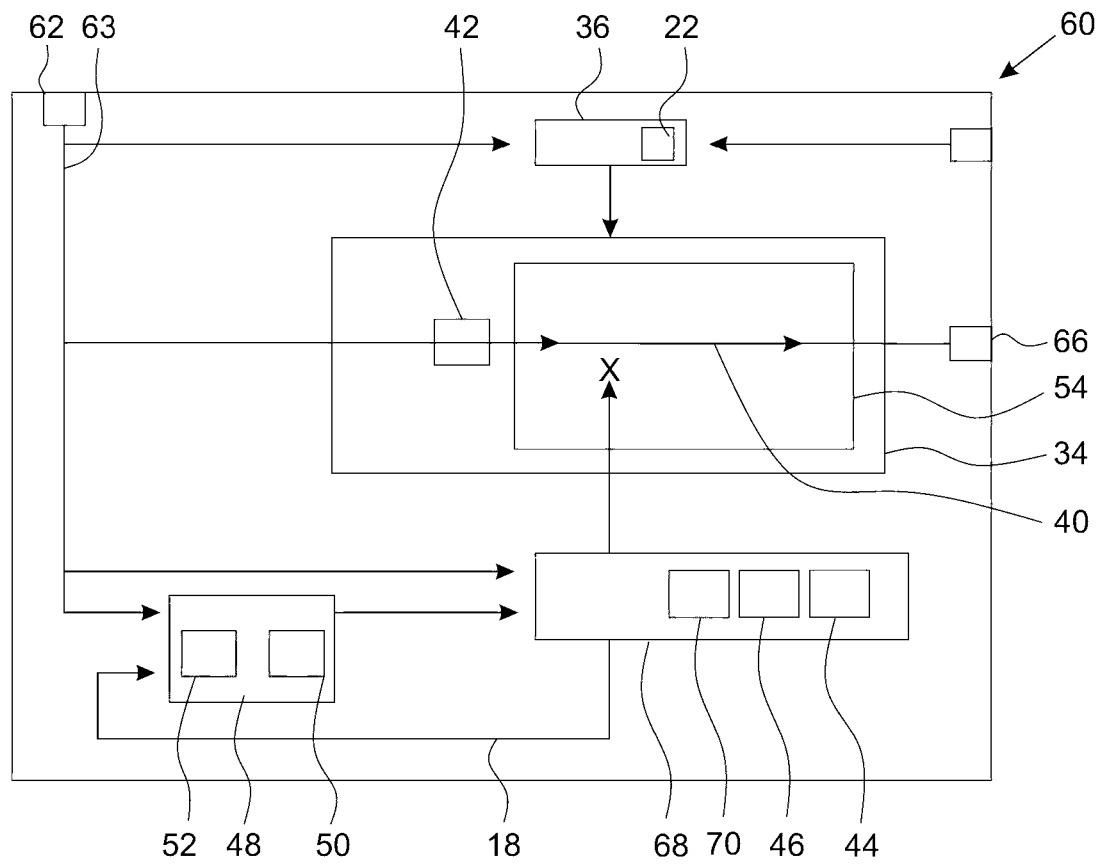
FIGS. 6 and 7 shows schematic diagrams of another embodiment of a system for transmitting a data stream.

FIG. 6 shows a schematic diagram of still another embodiment of a system 60 for transmitting a data stream 12, where parts similar or identical in form and/or function are similarly numbered to those in FIGS. 1 to 4. The system 60 has a deserialiser 62 for de-serialising the data stream 12 when so received thereby which is then in the form of a raw parallel data stream 63 carrying the plurality of orders. The system has a serialiser 66 for serialising the raw parallel data stream 12.

The system 60 is configured to:
process at least the plurality of orders to determine trading risk information indicative of trading risk;
determine if the trading risk indicated by the trading risk information satisfies a trading risk condition;
cease transmitting the data stream carrying the plurality of orders if the trading risk condition is determined to be satisfied and commenced transmitting another data stream destined for the electronic market.

Figure 7:
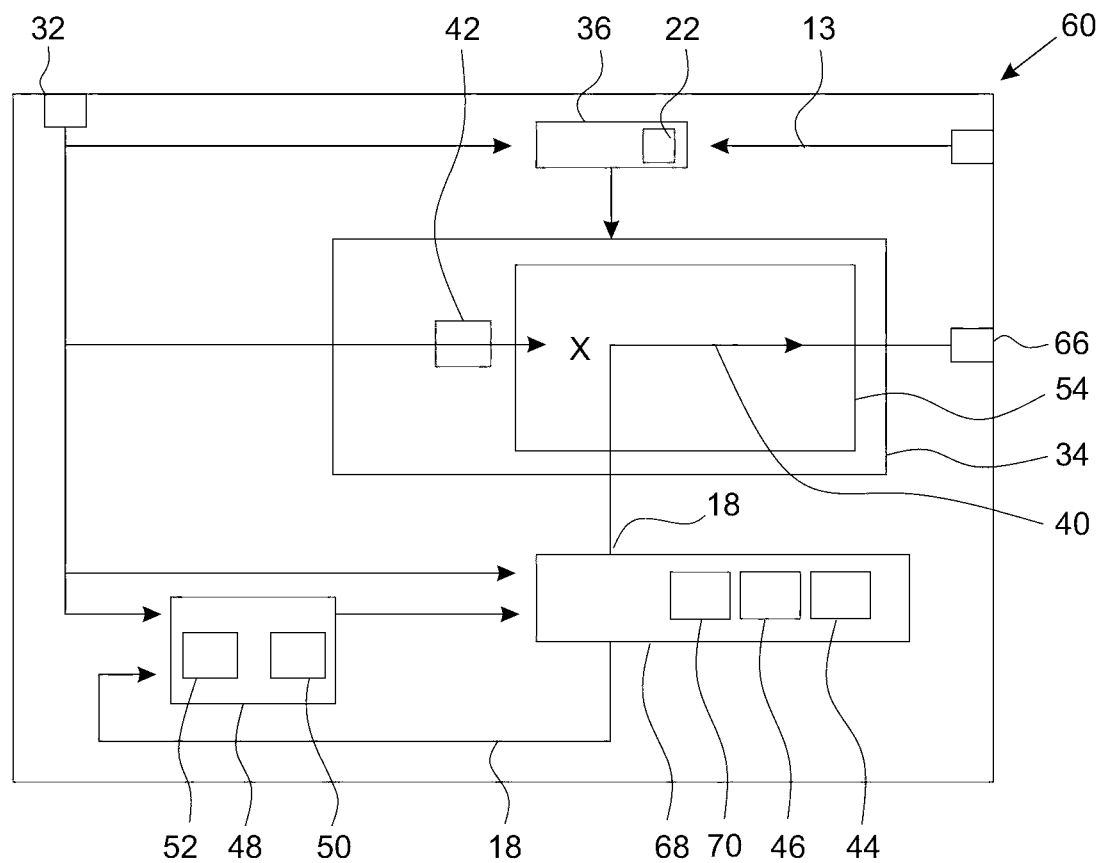

The system 60 has a parallel data generator 68 figured to generate the other data stream 18. In this embodiment, the other data stream 18 is a parallel data stream. The system 60 has reconfigurable circuitry 34 having a first configuration for communicating the raw parallel data stream to the serialiser 66. The system 60 is shown with the reconfigurable circuitry 34 in the first configuration. The reconfigurable circuitry 34 also has a second configuration communicating the other raw parallel data stream 18 to the serialiser 66. The system 60 is shown in FIG. 7 with the reconfigurable circuitry 34 in the second configuration.

The system 60 has a controller 36 configured to process at least the plurality of orders to determine trading risk information indicative of the trading risk, determine if the trading risk indicated by the trading risk information satisfies a trading risk condition, and if the trading risk condition is determined to be satisfied then trigger reconfiguration of the reconfigurable circuitry 34. In this but not necessarily all embodiments, the controller 48 is configured to extract the plurality of orders from the data stream 12. The controller 36 is configured to trigger the reconfiguration of the reconfigurable circuitry 34 from the first configuration shown in FIG. 6 to the second configuration shown in FIG. 7.

In the first configuration, the reconfigurable circuitry 34 has a raw parallel data stream path 40 that connects the serialiser 62 and deserialiser 66 for communicating the raw parallel data stream to the serialiser 66. In the second configuration shown in FIG. 7, the parallel data generator 68 is in communication with the serialiser 66 for communicating the other parallel data stream to the serialiser 66. The raw parallel data stream path 40 comprises a raw parallel data stream delay element 42, at least in this but not all embodiments, the raw parallel data stream delay element 46 comprises at least one register. The raw parallel data stream path 40 has a latency of less than at least one of 1 clock cycle; substantially the number of clock cycles it takes to determine the trigger condition; substantially the number of clock cycles in a payload; and the number of clock cycles required to synchronise the other parallel data stream.

The system 60 has a synchroniser 48. The synchroniser 48 is configured to generate synchronisation information from the data stream 63 and sends the synchronisation information to the data generator 68 which synchronises the other data stream 18 and the data stream 63 using the synchronisation information. The parallel data generator 68 comprises a block generator 46 configured to generate at least one block. The parallel data generator 68 comprises a block aligner 44 configured to use the synchronisation information to give the at least one block of the other raw parallel data stream 18 the same block alignment as the plurality of blocks of the raw parallel data stream 63. The parallel data generator 68 comprises a block scrambling synchroniser 70 configured to use the synchronisation information to synchronise the scrambling of the other raw parallel data stream 18 and the raw parallel data stream 63 at the serialiser 66. The parallel data generator 68 is configured to give the other data stream 18 a clock period recovered from the data stream by the deserialiser 32. The synchronisation information is used by the data generator 68 to generate the other data stream 18 such that a protocol rule is not violated when the reconfigurable circuitry 34 is reconfigured between the first configuration and the second configuration.

In this embodiment, the system 60 comprises a logic device that has the controller 36, the parallel data stream generator 68 and the synchroniser 48. Other embodiments, however, may only have a subset of these modules on the logic device. In this embodiment, the logic device is in the form of a field programmable gate array (FPGA), however in other embodiments it may take the form of an application specific integrated circuit (ASIC), or a complex programmable logic device (CPLD), or generally any suitable form of logic device. The reconfigurable circuitry 34 comprises a switch 54 in the form of a crosspoint switch.

Figure 8:
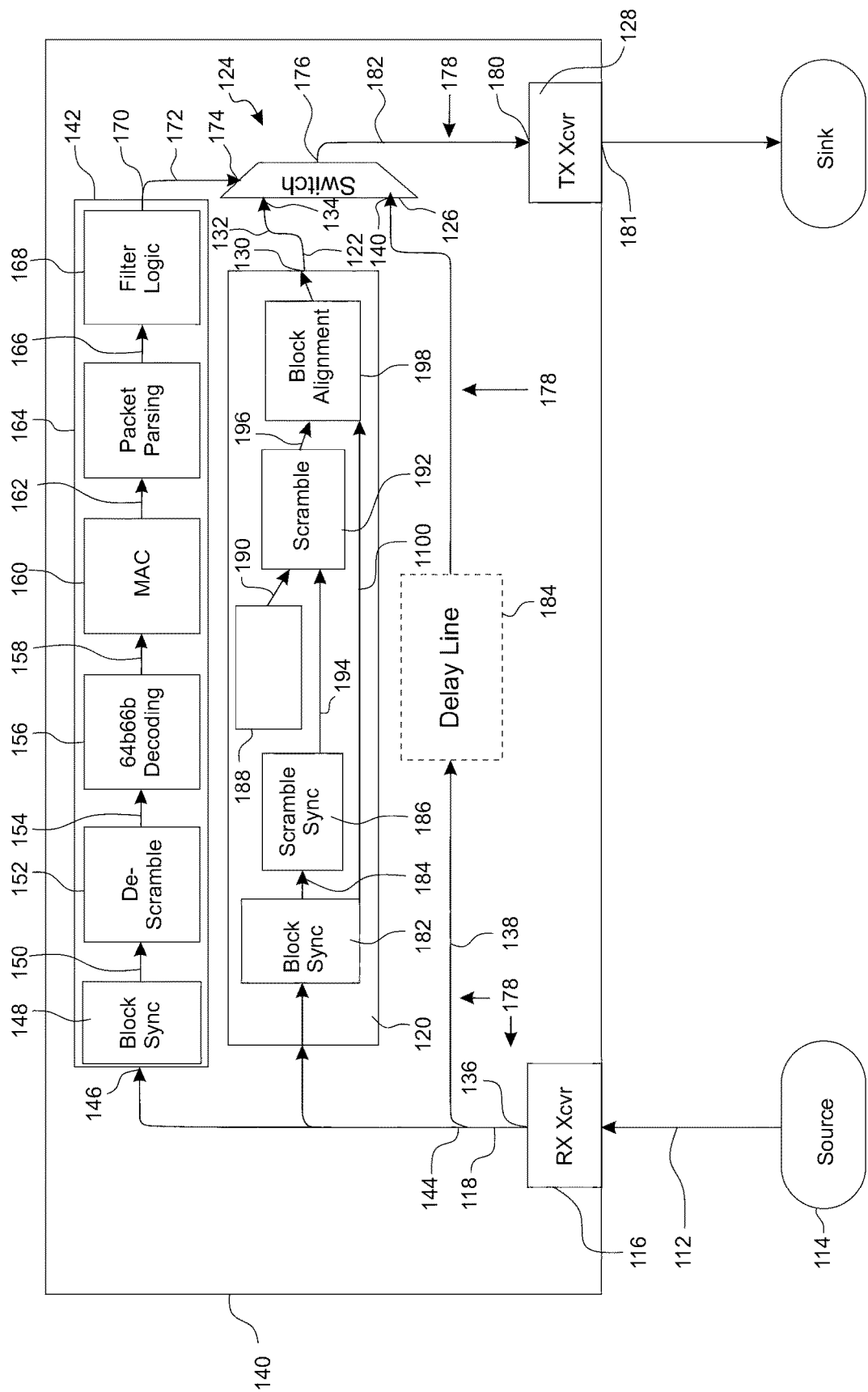
FIG. 8 shows a schematic diagram of another embodiment of a system for transmitting a data stream.

FIG. 8 shows a schematic diagram of another embodiment of a system 300 for transmitting a data stream. The deserialiser 116 of the system 300 receives a line encoded data stream 112 carrying the plurality of orders from a source 114, for example a network cable of a network in the form of a local area network. The de-serialiser 116 is for de-serialising the line encoded data stream 112 to generate the raw parallel data stream 118. The system has a serialiser 128 for serialising the raw parallel data stream 118. The system 300 has a data generator in the form of a parallel data generator 120 configured to generate another raw parallel data stream 122. The system 300 has reconfigurable circuitry 124 for communicating raw parallel data stream 118 to the serialiser 128 in a first configuration and communicating the other parallel data stream 122 in a second configuration.

The reconfigurable circuitry 124 comprises a switch 126 in the form of switch fabric (in alternative embodiments a cross point switch, or generally any suitable switch, may be used). The output 130 of the parallel data generator 120 is connected via a bus 132 to an input 134 of the reconfigurable circuitry 124.

An output 136 of the deserialiser 116 is connected via bus 138 to another input 140 of the reconfigurable circuitry 124.

The system 300 has a controller 142 configured to confirm satisfaction of a trigger condition and subsequently trigger reconfiguration of the reconfigurable circuitry 124. The parallel data generator 120 is configured for the other raw parallel data stream 122 to be synchronised to the raw parallel data stream 118 at the serialiser 128. That is, at least one of following properties of the data stream input to the serialiser are preserved by reconfiguration of the reconfigurable circuitry: The block alignment, the block scrambling sequence, and the data stream input's clock.

In the embodiment of FIG. 8, the controller 142 is configured to confirm satisfaction of the trigger condition and subsequently trigger the reconfigurable circuitry 124 to reconfigure for communicating the other parallel data stream 122 to the serialiser 128. For example, the controller 142 may be configured to confirm that the raw parallel data stream 118 satisfies the trigger condition and subsequently trigger the reconfigurable circuitry 124 to reconfigure for communicating the other raw parallel data 122 to the serialiser. A tap 144 communicates the raw parallel data stream 118 to an input 146 of the controller 142. The controller 142 interrogates the raw parallel data stream 118 received at input 146. The raw parallel data stream 118 received at input 146 is communicated within the controller 142 via a conduit to a block synchronisation module 148 that determines the block offset of the raw parallel data stream 118 and generates a sequence of words 150 that each correspond to a respective block of the line encoded data stream. The sequence of words 150 is communicated via a conduit to a descrambling module 152 that descrambles the sequence of words. The descrambled sequence of words 154 are communicated via a conduit to a decoding module 156 in the form of a 64b/66b decoding module which decodes the descrambled sequence of words 154. The decoded sequence 158 is communicated via a bus to a media access control (MAC) module 160. The media access control module 160 retrieves a payload 162 that is communicated via a bus to a payload parsing module 164 to extract information 166 from the payload 162. The information 166 is communicated via a bus to a filter logic module 168 which determines if the information satisfies the trigger condition. If the filter logic model 168 determines that the information does indeed satisfy the trigger condition then the controller 142 generates a trigger signal 170 that is communicated via trigger signal conduit 172 to the reconfigurable circuitry 124 and in particular input 174 of switch 126. The switch 126 receives the trigger signal 170, which causes the switch to reconfigure such that the output 176 of the switch 126 is placed in communication with the input 134 of the switch 126, input 134 being in communication with the output 130 of the parallel data generator.

In the configuration in which the raw parallel data stream 118 is communicated to the serialiser 128, the reconfigurable circuitry 124 has a raw parallel data stream path 178 in the form of a bus that connects the output 136 of the deserialiser 116 and the input 180 of the serialiser 128, via the input 140 of switch 126, and the output 176 of switch 126. The raw parallel data stream path includes the switch 126. In the other configuration, however, the parallel data generator 120 is in communication with the serialiser 128 for communicating the other parallel data stream 122 to the serialiser 128. In the other configuration, the other raw parallel data stream 122 generated by the data generator 120 is communicated via bus 122 to input 134 of switch 126, through the switch 126 to the switch output 176, and then communicated along bus 182 to the input 180 of the serialiser 128.

In this but not all embodiments, the raw parallel data stream path 178 comprises a delay line 184 electrically disposed between the deserialiser 116 and the switch 126. The delay line comprises at least one register for temporally delaying the raw parallel data stream 118. The delay introduced by the delay line 184 may be such that the latency of the raw parallel data stream path 178 is at least one of substantially the number of clock cycles of the line encoded data stream 118 it takes to determine the trigger condition, substantially the number of clock cycles of the line encoded data stream in a payload 118, and the number of clock cycles in the line encoded data stream 118 required to synchronise the other parallel data stream 122. In embodiments without a delay line 184, the latency of the raw parallel data stream path may be no more than one clock cycle of the line encoded data stream 118.

A latency of less than 1 clock cycle may be used if the data generator does not require any prior knowledge of the data stream. A latency of less than substantially the number of clock cycles it takes to determine the trigger condition may be used if knowledge of the trigger condition is required before the first part of the encoded data stream is output. A latency of substantially the number of clock cycles in a payload may be used if knowledge of the entire payload is required before the trigger condition can be determined. A latency of the number of clock cycles required to synchronise the other parallel data stream may be used if some information is required from the data stream to synchronise the parallel data stream, or if some processing time is required to synchronise the parallel data stream.

The data generator 120 is configured for the other data stream 122 to be synchronised to the line encoded data stream 118 at the serialiser 128. The other raw parallel data stream 122 is configured such that a protocol is not violated when the reconfigurable circuitry is reconfigured between the configuration and the other configuration. The parallel data generator 120 has another block synchronisation module 182 that generates block synchronisation information indicative of the alignment of a plurality of blocks of the raw parallel data stream and generates a sequence of words 184 communicated via a conduit to a scrambling synchronisation module 186. The scrambling synchronisation module generates scrambling information 194 indicative of the scrambling sequence of the plurality of blocks of the raw parallel data stream 118. The data generator 120 has a block generator 188 that generates at least one block 190. The at least one block may be scrambled in a scrambling module 192. The scrambling synchronisation module 186 is in communication with the scrambling module 192 for communicating the scrambling information 194 via a conduit to the scrambling module 192. The scrambling module 192 uses the scrambling information 194 to synchronise the scrambling of the at least one block 190 to the raw parallel data stream 118 at the scrambler 192. The scrambled at least one block 196 is communicated from the scrambling module 192 to the block alignment module 198, which is in communication with the block synchronisation module 182 via a conduit and receives therefrom block synchronisation information 1100. The block alignment module 198 gives the at least one block the same alignment as a plurality of blocks of the raw parallel data stream 118.

The system 300 (and the other systems described herein, as appropriate) may comprise a logic device 190 in the form of a field programmable gate array (FPGA), for example a VIRTEX 7, ARRIA 10, ULTRASCALE etc. In alternative embodiments, the logic device 190 may take the form of an application-specific integrated circuit (ASIC) or a complex programmable logic device (CPLD), or generally any suitable of logic device. In system 300, the serialiser 116, the reconfigurable circuitry 124, the deserialiser 128, the data generator 120, and the controller 142 are all on the logic device 190. In other embodiments, however, only some of the components are on the logic device, or may be in separate packages.

The deserialiser 116 recovers from the line encoded data stream 112 a line encoded data stream clock. The system 300 has a clock conduit for communicating the line encoded data stream clock from the deserialiser to the parallel data stream generator 120 which is internally clocked by the line encoded data stream clock. Consequently, the parallel data generator 120 is controlled by the line encoded data stream clock.

The development of computer network protocols has resulted in high bandwidth protocols, an example of which is the 10 Gigabit Ethernet protocol family, also known of 10GE, 10GbE or 10GigE, which has a nominal transmission rate of 10 Gbit/s (10.3125 Gbit/s actual). The 10GE protocol family is defined by standards published by the Institute of Electrical and Electronics Engineers (IEEE) 802.3 working group. The line encoded data stream in the embodiment of FIG. 1 is a 10 G Ethernet line encoded data stream with a 64b/66b Ethernet block code structure defined by the standard IEEE 802.3. It will be appreciated however, that the line encoded data stream may be of any suitable protocols examples of which include but are not limited to 1 G (IEEE 802.3-2008) and 10 G Ethernet (e.g. IEEE 802.3ae-2002) or other Ethernet defined by IEEE 802.3 or a variant thereof, FireWire, InfiniBand, USB, PCIe, and FiberChannel. Some forms of block encoding, including 10 G Ethernet and Hamming codes, include error detection and error correction. Other suitable protocols may have, for example, 8b/10b encoded blocks, 128b/132b encoded blocks, and 128b/132b encoded blocks.

The system may be inserted into a network in the form of, for example, a PAN, LAN, MAN, WAN or generally any suitable form of network.

Figure 9:
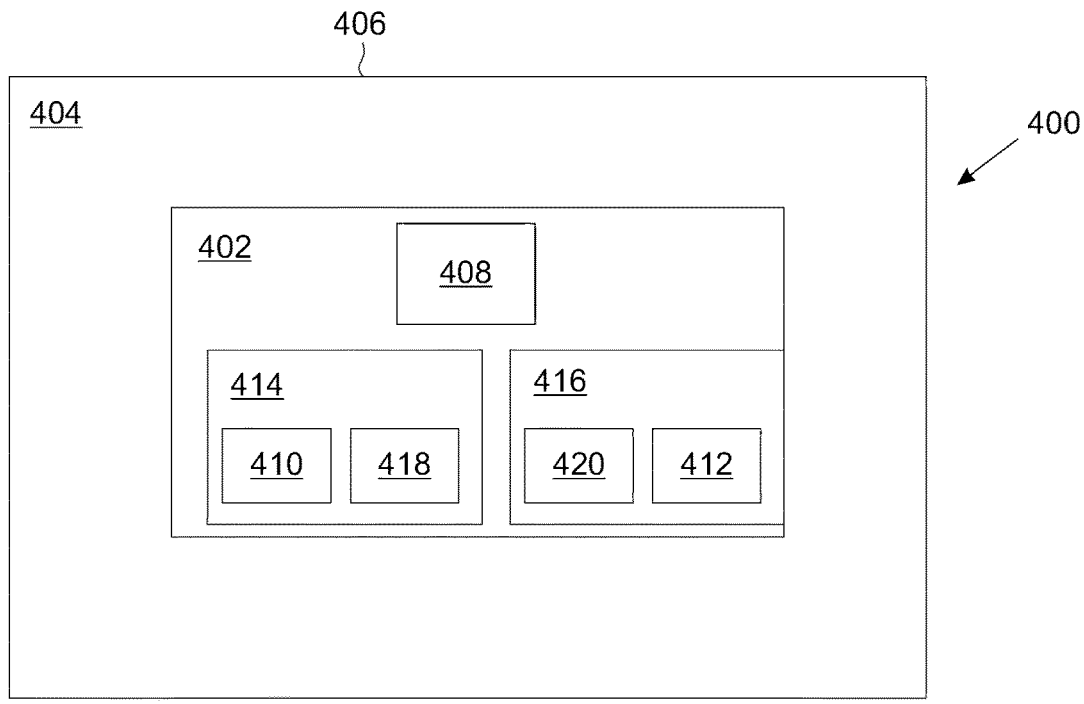
FIG. 9 shows a schematic diagram of one possible component architecture of embodiments of systems for transmitting a data stream.

FIG. 9 shows a schematic diagram of one possible component architecture 400 of embodiments described herein. The architecture 400 may comprise, or be on in full or in part, at least one printed circuit board 402 in the form of a multilayer printed circuit board and having components mounted thereto which generally, but not necessarily, are connected to each other by conduits in the form of conductive pathways, which may comprise, for example, tracks, signal traces, strip lines and/or micro strip lines, and wires, as appropriate. Generally, but not necessarily, the printed circuit board is housed by a rack mountable enclosure 404 having dimensions of 1 rack unit, although any suitable enclosure may be used or not used as desired. The system may be in the form of a unit 406, for example an enclosed unit. The printed circuit board has various surface mounted and/or through hole components mounted thereto. A mains supply 408 may be mounted to the printed circuit board 12, the main supply in use producing a relatively low voltage, such as 12, 24 or 48 volts as suitable, from a relatively high voltage source, for example, a 110V or 240V electricity grid. There may be a DC regulator in the form of a switched mode power supply module mounted to the printed circuit board that receives the low voltage output from the mains supply 14 and powers two or more active conductive rails integral to the circuit board. Alternatively, the mains supply and DC regulator may be mounted within the enclosure separate from the printed circuit board.

At least one fan may be mounted to the circuit board or alternatively the enclosure. The at least one fan may provide airflow across the multilayer printed circuit board to extract waste heat.

The sources may be another component on the circuit board, for example a receiver 410 in the form of, for example, an optical-to-electrical (o/e) converter. The destination may be, for example, a transmitter 412 in the form of, for example, an electrical-to-optical (o/e) converter. In alternative embodiments described further below, the receiver and transmitter provide an electrical-to-electrical interface, for example supporting BASE-T Ethernet or direct attach electrical network cables. Generally, the receivers and transmitters are ports for connection to a network medium/a computer network. In this embodiment, but not necessarily in all embodiments, the o/e and e/o converters are configured to accept a network cable in the form of an optical network cable, specifically to receive two LC connectors terminating respective optical fibre cables, but any suitable connectors (FC, SC for example) may be used. The receivers 410, 420 and transmitters 412, 4420 may be distributed between separate transceivers 414, 416 that may each be in the form of, for example, an enhanced small form factor pluggable (SFP+) transceivers. Generally, however, any suitable transceiver may be used, for example any of gigabit interface converter (GBIC), small form factor plugable (SFP), 10 gigabit small form factor pluggable (XFP), 10 Gigabit Media Independent Interface (XAUI), C form-factor pluggable (CFP), quad small form-factor pluggable (QSFP), CXP specified by the Infiniband Trade Association, an Ethernet transceiver, and a Thunderbolt transceiver. The transceiver may be received in a transceiver socket, the received transceiver being selected for the attached network physical medium. Transceiver 414, for example, is generally for communication with the client machine, and transceiver 416, for example, is generally for communication with the market. Any of the embodiments described herein may be generally in intermediate communication with the client machine and the market, and within the network/internetwork to which the client machine and market are connected. The o/e and e/o converters may alternatively be configured to receive an electrical network cable in the form of, for example, a copper network cable. Alternatively, the source may be from within the logic device, for example the FPGA.

The o/e and e/o converters may be housed in enclosures in the form of SFP cages fixed to the printed circuit board. The cages provide an electrical connection between electrical contacts on the transceivers and the conductive tracks. The cages may also act as Faraday cages to reduce electromagnetic interference, and extract heat from the transceiver. In alternative embodiments, the transceivers may be mounted directly to the printed circuit board.

The field programmable array may have any suitable architecture. In one embodiment, the FPGA architecture comprises an array of configurable logic blocks, I/O leads or pins, and routing channels. Generally, but not necessarily, the logic blocks comprises of logical cells that may comprise of, for example, a look up table, a full adder, and a D-type flip flop. Clock signals may be routed through special purpose dedicated clock networks within the FPGA in communication with a CDR module. The FPGA 24 may also include higher-level functionality including embedded multipliers, generic digital signal processing blocks, embedded processors, high-speed I/O logic for communication with components external of the FPGA (for example), and embedded memories that may be used by buffers.

The internal structure of the FPGA is configured to form a plurality of modules. The modules are initially specified, for example, using a hardware description language, examples of which include VHDL and VERILOG. The functionality to be implemented on the FPGA is described in a hardware description language. The description is compiled, synthesized and mapped to the FPGA using appropriate EDA tools to a configuration file that, when loaded or programmed into the FPGA, causes the FPGA to implement the functionality described.

Embodiments of the systems 10, 30, 60, 100, 300 are generally configured for low latency. Systems 10, 30, 60, 100, 300, but not necessarily all embodiments, have a latency less than at least one of 100 ns and 50 ns. For example, the disclosed embodiments may have a latency in the range of 30 ns and 100 ns. Latency may be the time for the data stream 12 to pass between input port 15 and one of output port 19, 21, for example.

Figure 10:
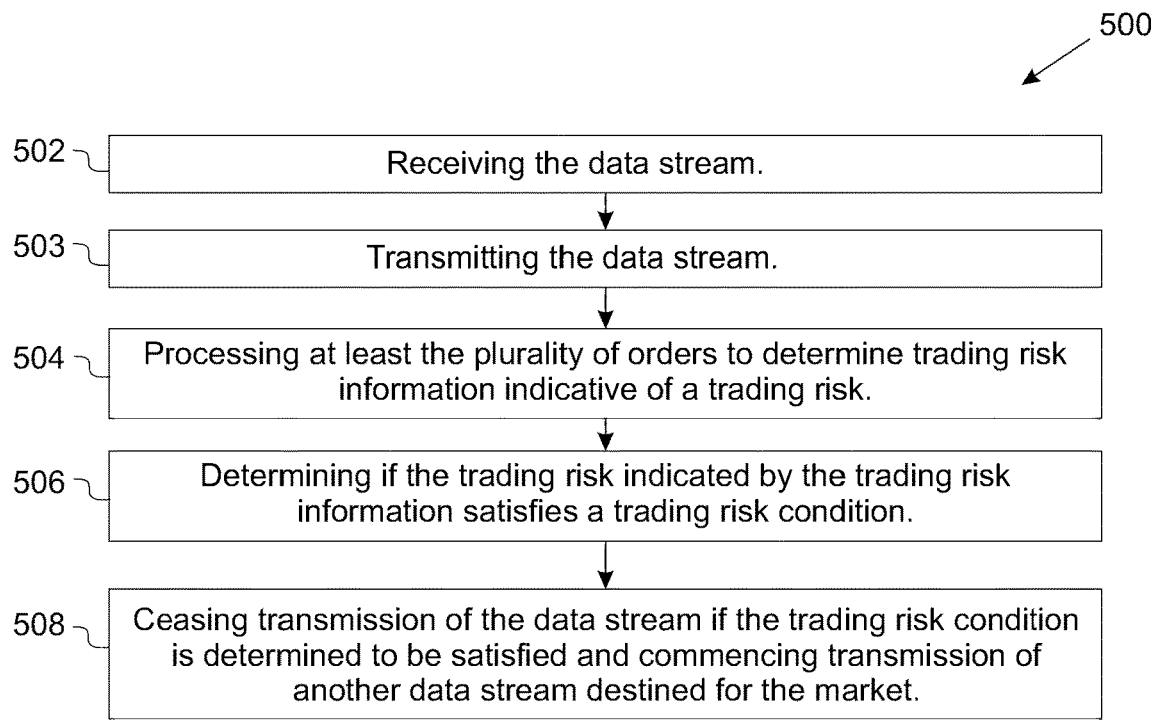
FIG. 10 shows a flow diagram of a method for transmitting a data stream.

FIG. 10 shows a flow diagram 500 for an embodiment of a method for transmitting a data stream that may be performed using embodiments described herein. The method comprises the step 502 of receiving the data stream 12. The data stream 12 carries a plurality of orders that are destined for a market configured for electronic trading. The method comprises the step 503 of transmitting the data stream 12. The method comprises the step 504 of processing at least the plurality of orders to determine trading risk information indicative of a trading risk. The method comprises the step 506 of determining if the trading risk indicated by the trading risk information satisfies a trading risk condition. The method comprises the step 508 of ceasing transmission of the data stream if the trading risk condition is determined to be satisfied and commencing transmission of another data stream destined for the market. Other steps may optimally be performed as described with respect of embodiments described herein.

Generally, for example in the present but not all embodiments, the following are simultaneously performed: receiving the network stream 12, transmitting the network stream 12 and processing at least the plurality of orders to determine if the trading risk indicated by the trading risk information satisfies a trading risk condition. That is, these may be executed as a plurality of parallel operations. Instead of storing and forwarding each of the orders, and determining trading risk during storage, the network stream 12 is cut through the system 10. The parallel operations may reduce the latency of the plurality of orders being sent to the market, and may still provide determination and control of trading risk. Generally, for example in the present but not all embodiments, the system is configured to simultaneously receive the network stream and commence transmitting the other data stream 18 ("other network stream") in place of the network stream 18. The system 10 may continue to receive the network stream 12 while transmitting the other network stream 18.

The client machine may take the form of a computer server, an example of which includes but is not limited to a Dell R720 server, however it will be appreciated that the machine may take other forms, for example a personal computer or industrial computer, or generally any suitable form. The systems may be each in the form of a peripheral for the client. The peripheral may be of any standard or proprietary design, such as conventional PCI, ISA, VESA, PCI Express (PCIe), PCI-X, etc expansion device. In this example, the peripheral is in the form of a PCI Express expansion card arranged to be received by an expansion slot within the client. In another example, the peripheral may take the form an integrated circuit fitted onto a motherboard, called a planar device in the PCIe specification. The peripheral may be an external peripheral connected to the client 20. The external connection may be via a PCIe connection (e.g. Thunderbolt), a parallel connection, or generally any suitable connection. Generally, the peripheral may take any suitable form. The PCI specification covers the physical size of the bus (including the size and spacing of the circuit board edge electrical contacts), electrical characteristics, bus timing, and protocols. The specification can be purchased from the PCI Special Interest Group (PCI-SIG).

The peripheral has an FPGA and network hardware including at least one communication port 81 comprising transceivers (for example, SFP+, GBIC or generally any suitable transceivers) mounted on a card. The card also includes a PCI express connector arranged to be received by a PCI express slot in the client. The FPGA generally, but not necessarily, comprises a plurality of cooperating modules. The functions or components may be compartmentalised into modules or may be fragmented across several modules. The modules may be specified using any suitable hardware description language, examples of which include but are not limited to VHDL and VERILOG, SYSTEMVERILOG, SYSTEM-C and the LABVIEW FPGA add on module.

The electronic orders are generally payloads of a datagram, for example payloads of an Ethernet frame. The datagrams generally, but not necessarily, comprise, for example, a header, and a payload. The datagrams may also have a trailer. The communications may be structured in accordance with the Open Systems Interconnection Model, in which each payload may be itself another packet of another layer of the OSI model. For example, at the physical layer the packet is a collection of bits. The physical layer packet may comprise a data link packet having a datalink header, a datalink payload and a datalink trailer. The datalink payload may in turn comprise a Network data packet such as an IP packet. The IP packet payload may comprise a TCP or UDP packet ("segment"). This layered structure may continue to the Application layer.

Alternatively or additionally, communication cables are inserted into the ports of the peripherals and also into a port at the relevant markets which may be a port at an electronic trading platform. The communication cables form point-to-point connections between the gateways and the markets. The client machine 20 and gateways may be located at one of the markets, for example in a datacentre at the market. This may provide low latency for orders sent to the market or markets. The gateways may also communicate with the system via networking card and the network. Alternatively or additionally, communication cables connect the gateways directly with the systems 10 to form point-to-point connections. Communications may be wireless, for example via Wi-Fi.

Another hardware architecture that may be used for the systems. The architecture is that of a processor. Methods may be coded in a program for instructing the processor. The program is, in this example stored in nonvolatile memory in the form of a hard disk drive, but could be stored in FLASH, EPROM or any other form of tangible media within or external of the processor. The program generally, but not necessarily, comprises a plurality of software modules that cooperate when installed on the processor so that the steps of at least one method are performed. The software modules, at least in part, correspond to the steps of the method or components of the system described above. The functions or components may be compartmentalised into modules or may be fragmented across several software modules. The software modules may be formed using any suitable language, examples of which include C++ and assembly. The program may take the form of an application program interface or any other suitable software structure. The processor includes a suitable micro processor such as, or similar to, the INTEL XEON or AMD OPTERON micro processor connected over a bus to a random access memory of around 1 GB and a non-volatile memory such as a hard disk drive or solid state non-volatile memory having a capacity of around 1 Gb. Alternative logic devices may be used in place of the microprocessor. Examples of suitable alternative logic devices include application-specific integrated circuits, FPGAs, and digital signal processing units. Some of these examples may be entirely hardware based for further latency reduction. The architecture has input/output interfaces which may include one or more network interfaces, and a universal serial bus. The architecture may support a human machine interface e.g. mouse, keyboard, display etc.

In the illustrated examples, the network comprises optical and/or electrical Ethernet as generally defined by IEEE 802.3 or a variant thereof (for example, 10 Mb, 40 Mb, 1 Gb, 10 Gb, 40 Gb, 100 Gb, 400 Gb, and 1Tb Ethernet), however, it will be understood that other network types and protocols may be used, such as INFINIBAND and Wi-Fi. Generally, any packet based protocol may be used. The network may be a local area network, wide area network, or may be replaced by an internetwork, for example the Internet. Alternatively or additionally, one or more of the network connections may comprise a serial port connection, a USB port connection, a FireWire™ port connection, a ThunderBolt™ port connection, a PCI or PCIe connection, a SONET (or SDH) connection with or without a sonnet demultiplexing device, or generally any suitable type of connection, including a point-to-point connection.

Variations and/or modifications may be made to the embodiments described without departing from the spirit or ambit of the invention. The present embodiments are, therefore, to be considered in all respects as illustrative and not restrictive.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method comprising:
receiving, at a system, a data stream comprising a plurality of data stream units, wherein a data stream unit of the plurality of data stream units comprises an order for causing a response action by a destination device;
transmitting the data stream towards the destination device;
transmitting the data stream unit of the plurality of data stream units to a controller;
analyzing, by the controller, the data stream unit to obtain trading risk threshold information;
making a determination, by the controller and using the trading risk threshold information, that a trading risk threshold will be breached as a result of the order in the data stream unit; and
based on the determination, switching from transmitting the data stream towards the destination device to transmitting an alternate data stream towards the destination device, wherein the alternate data stream comprises an alternate data stream unit comprising an updated order configured to cause a different response action by the destination device,
wherein the alternate data stream and the data stream are processed in parallel by the controller and the updated order comprises a lower trading risk than a trading risk associated with the data stream.

2. The method of claim 1, wherein switching to transmitting the alternate data stream causes the threshold to not be breached.

3. The method of claim 2, further comprising:
after the threshold is not breached, switching from transmitting the alternate data stream towards the destination device to transmitting the data stream towards the destination device.

4. The method of claim 1, further comprising:
before transmitting the data stream towards the destination device, delaying the transmitting for a length of time required to make the determination.

5. The method of claim 4, further comprising:
before transmitting the data stream towards the destination device, delaying the transmitting for an additional length of time required to perform a synchronization action set to synchronize the data stream and the alternate data stream.

6. The method of claim 5, wherein the synchronization action set comprises aligning an alternate data stream block of the alternate data stream with a data stream block of the data stream.

7. The method of claim 5, wherein performing the synchronization action set comprises:
obtaining timing characteristics from the data stream; and
adjusting, using the timing characteristics, the alternate data stream to include the timing characteristics.

8. The method of claim 5, wherein performing the synchronization action set comprises:
detecting a phase offset between the data stream and the alternate data stream; and
based on the phase offset, aligning a phase of the data stream and the alternate data stream.

9. The method of claim 5, wherein the synchronization action set comprises synchronizing a block scrambling of the alternate data stream with the data stream.

10. The method of claim 1, wherein switching from transmitting the data stream towards the destination device to transmitting the alternate data stream towards the destination device comprises reconfiguring reconfigurable circuitry of a logic device.

11. A system, comprising:
reconfigurable circuitry operatively connected to a data stream source and a data stream destination and configured to:
receive a data stream comprising a plurality of data stream units, wherein a data stream unit of the plurality of data stream units comprises an order for causing a response action by a destination device;
transmit the data stream towards the destination device; and
transmit the data stream unit of the plurality of data stream units to a controller;
the controller operatively connected to the reconfigurable circuitry and configured to:
analyze the data stream unit to obtain trading risk threshold information;
make a determination, by the controller and using the trading risk threshold information, that a threshold will be breached as a result of the order in the data stream unit; and
based on the determination:
switch from transmitting the data stream towards the destination device to transmitting an alternate data stream towards the destination device, wherein the alternate data stream comprises an alternate data stream unit comprising an updated order configured to cause a different response action by the destination device and the updated order has a lower trading risk than a trading risk associated with the data stream;
wherein the controller processes the alternate data stream and the data stream in parallel, and a data generator operatively connected to the controller and the reconfigurable circuitry and configured to:
generate the alternate data stream; and
transmit the alternate data stream to the reconfigurable circuitry.

12. The system of claim 11, wherein the switch to transmitting the alternate data stream causes the threshold to not be breached.

13. The system of claim 12, wherein the controller is further configured to:
after the threshold is not breached, switch from transmitting the alternate data stream towards the destination device to transmitting the data stream towards the destination device.

14. The system of claim 11, wherein the reconfigurable circuitry comprises a delay element, comprising circuitry, and configured to:
before transmitting the data stream towards the destination device, delay the transmission for a length of time required to make the determination.

15. The system of claim 14, wherein:
the data generator is further configured to perform a synchronization action set to synchronize the data stream and the alternate data stream before transmitting the alternate data stream to the reconfigurable circuitry; and
the delay element is further configured to, before transmitting the data stream towards the destination device, delay the transmission for an additional length of time required to perform the synchronization action set.

16. The system of claim 15, wherein the data generator comprises a block aligner, comprising circuitry, and configured to, as part of the synchronization action set, align an alternate data stream block of the alternate data stream with a data stream block of the data stream.

17. The system of claim 15, wherein, to perform the synchronization action set, the data generator is further configured to:
obtain timing characteristics from the data stream; and
adjust, using the timing characteristics, the alternate data stream to include the timing characteristics.

18. The system of claim 15, wherein, to perform the synchronization action set, the data generator is further configured to:
detect a phase offset between the data stream and the alternate data stream; and
based on the phase offset, align a phase of the data stream and the alternate data stream.

19. The system of claim 15, wherein the data generator comprises a block scrambling synchronizer, comprising circuitry, and configured to, as part of the synchronization action set, synchronize a block scrambling of the alternate data stream with the data stream.

20. The system of claim 11, wherein, to switch from transmitting the data stream towards the destination device to transmitting the alternate data stream towards the destination device, the controller is further configured to reconfigure the reconfigurable circuitry to facilitate the switch.

* * * * *